W. V. TURNER.
HIGH PRESSURE EMERGENCY BRAKE.
APPLICATION FILED JUNE 2, 1910.
1,012,760.
Patented Dec. 26, 1911.
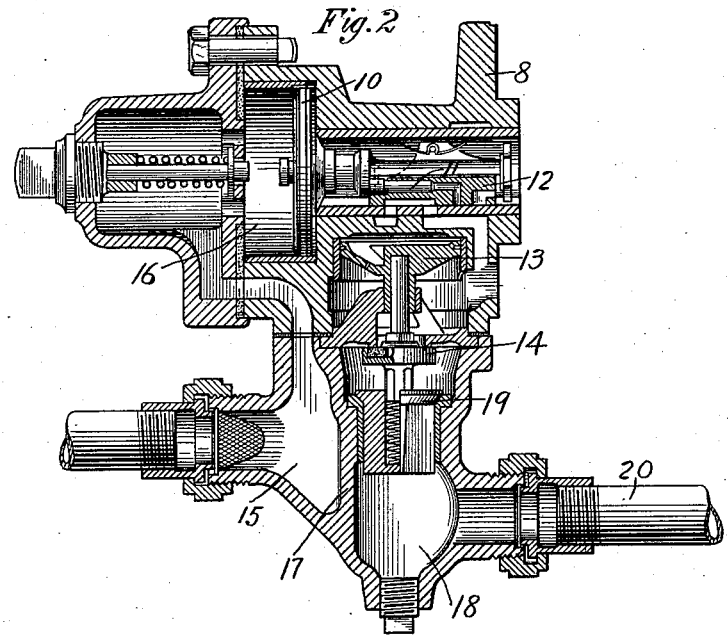
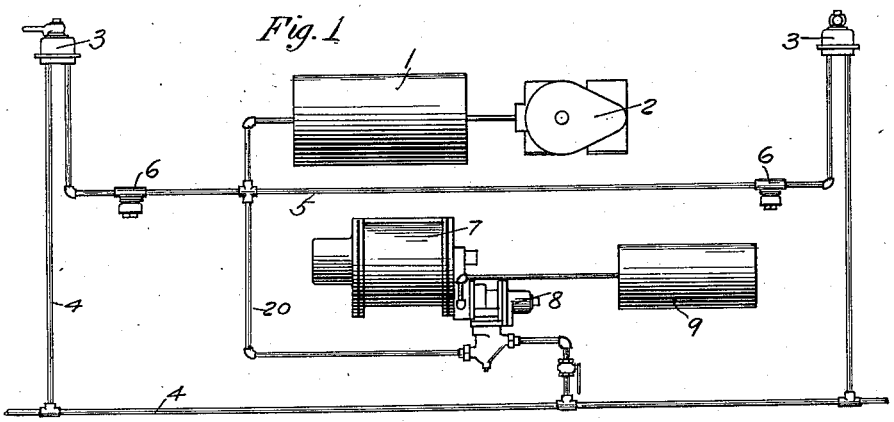
WITNESSES
INVENTOR
Walter V. Turner
by E. Wright Att'y.

UNITED STATES PATENT OFFICE.

WALTER V. TURNER, OF EDGEWOOD, PENNSYLVANIA, ASSIGNOR TO THE WESTINGHOUSE AIR BRAKE COMPANY, OF PITTSBURGH, PENNSYLVANIA, A CORPORATION OF PENNSYLVANIA.

HIGH-PRESSURE EMERGENCY-BRAKE.

1,012,760. Specification of Letters Patent. Patented Dec. 26, 1911.

Application filed June 2, 1910. Serial No. 564,578.

*To all whom it may concern:*

Be it known that I, WALTER V. TURNER, a citizen of the United States, residing at Edgewood, in the county of Allegheny and State of Pennsylvania, have invented new and useful Improvements in High-Pressure Emergency-Brakes, of which the following is a specification.

This invention relates to fluid pressure brakes, and more particularly to a brake apparatus adapted to obtain a high degree of pressure in the brake cylinder in an emergency application of the brakes.

It has heretofore been proposed to employ a supplemental reservoir on each car, a control pipe line or other receptacle which is adapted to be normally kept charged at the pressure carried in the system, and from which upon an emergency application fluid is admitted to the brake cylinder to obtain the desired high degree of pressure.

The main reservoir or source of pressure from which air is supplied to the train pipe is ordinarily maintained at a higher degree of pressure than that carried in the system, a feed valve device being provided so as to limit the maximum degree of pressure in the brake system to a predetermined amount.

According to the principal object of my invention I propose to provide means for supplying fluid under pressure from the main reservoir or other source of pressure, higher than the pressure of the system, to the brake cylinder in an emergency application of the brakes, thus doing away with a suplemental reservoir, control pipe line, or other additional source of pressure. Furthermore, by employing a source of high pressure, the brake cylinder is more quickly charged to the full pressure of the system and this is highly desirable, as the time required to fully apply the brakes is an important factor in case of an emergency.

In the accompanying drawing, Figure 1 is a diagrammatic view of a motor car equipment with my improvement applied thereto; and Fig. 2 a central sectional view of a quick action triple valve device embodying my invention.

The equipment on the car, as illustrated in Fig. 1, may comprise a main reservoir 1, compressor 2, a brake valve 3 on each end of the car connected to train pipe 4 and pipe 5 leading to the main reservoir and containing a feed valve device 6, the equipment also comprising a brake cylinder 7, triple valve device 8, and auxiliary reservoir 9.

As shown in Fig. 2, the triple valve device may be of the ordinary standard quick action type having the usual piston 10, main and graduating valves 11 and 12 respectively, and an emergency piston 13 for operating the emergency valve 14. According to my invention, instead of the usual lower drain cup section of the triple valve body, one is provided in which the train pipe passage 15 is only open to the main triple piston chamber 16, a wall 17 preferably cutting off communication from the train pipe to chamber 18 below the emergency check valve 19. A pipe 20 leading from the main reservoir 1 opens into the chamber 18, so that said chamber and the chamber between the valve 14 and the emergency check valve 19 is normally at main reservoir pressure. It will now be evident that upon a sudden reduction in train pipe pressure when the triple valve piston 10 moves out to emergency position, and fluid from the auxiliary reservoir is admitted to the emergency piston through port 21 in the usual manner, said abutment will be operated to open valve 14 and permit the flow of air from the main reservoir to the brake cylinder. As the main reservoir pressure is in excess of the normal pressure carried in the system, a prompt charging of the brake cylinder is effected through the large opening made by the movement of emergency valve 14, up to the equalized pressure of the auxiliary reservoir, the emergency piston 13 being shifted to normal position closing the emergency valve 14 when the pressures on opposite sides of the piston become equalized.

By the present construction, supplemental reservoirs, control pipe lines, or other additional sources of fluid pressure are dispensed with, while retaining all the advantages thereof and in addition, the more rapid charging of the brake cylinder up to the full equalized pressure is secured owing to the high pressure of the source of supply.

If it is desired to provide for quick action in emergency applications, a vent valve device may be provided which is adapted to be operated upon a sudden reduction in train pipe pressure to locally vent air from the train pipe, such as the vent valve shown in my pending application Serial No. 560,235, filed May 9, 1910.

While the usual quick action parts of the triple valve device are preferably employed for controlling the supply of fluid from the main reservoir to the brake cylinder, as a matter of utility and economy, it will be evident that a separate valve mechanism operating in a similar manner upon a sudden reduction in train pipe pressure may be employed, if desired.

Having now described my invention, what I claim as new and desire to secure by Letters Patent, is:—

1. In a fluid pressure brake, the combination with a main reservoir, triple valve, brake cylinder, and train pipe, of an emergency valve mechanism operating upon a sudden reduction in train pipe pressure for supplying air from the main reservoir to the brake cylinder.

2. In a fluid pressure brake, the combination with a train pipe, triple valve, and brake cylinder, of a source of pressure, the pressure of which is in excess of the normal pressure carried in the brake system and an emergency valve mechanism operating upon a sudden reduction in train pipe pressure for supplying air from said source of pressure to the brake cylinder.

3. In a fluid pressure brake, the combination with a train pipe, triple valve, and brake cylinder, of a source of fluid under pressure adapted to carry a pressure in excess of the normal pressure of the brake system and an emergency valve mechanism operated by said triple valve device upon a sudden reduction in train pipe pressure for supplying air from said source to the brake cylinder.

4. In a fluid pressure brake, the combination with a train pipe, brake cylinder, and a source of pressure for the brake system, of a triple valve device and an emergency valve mechanism adapted to be operated upon a sudden reduction in train pipe pressure for supplying air from said source to the brake cylinder.

5. In a fluid pressure brake, the combination with a train pipe, brake cylinder, triple valve device, and a main reservoir, of a feed valve device for limiting the maximum degree of pressure supplied to the train pipe, and an emergency valve mechanism operating upon a sudden reduction in train pipe pressure for supplying fluid from the main reservoir to the brake cylinder.

6. In a fluid pressure brake, the combination with a train pipe, brake cylinder, triple valve device, and a main reservoir, of a feed valve device for limiting the maximum degree of pressure supplied to the train pipe, a valve for controlling communication from the main reservoir to the brake cylinder, and a piston operated by auxiliary reservoir pressure upon a sudden reduction in train pipe pressure for actuating said valve to supply fluid from the main reservoir to the brake cylinder.

7. In a fluid pressure brake, the combination with a train pipe, brake cylinder, and a source of fluid under pressure adapted to normally carry a pressure higher than the pressure of the brake system, of an automatic valve device operating upon a sudden reduction in train pipe pressure for effecting an emergency application of the brakes and for supplying fluid from said source to the brake cylinder.

In testimony whereof I have hereunto set my hand.

WALTER V. TURNER.

Witnesses:
CHAS. A. ROWAN,
A. M. CLEMENTS.

---

Copies of this patent may be obtained for five cents each, by addressing the "Commissioner of Patents, Washington, D. C."